(12) United States Patent
Dong et al.

(10) Patent No.: US 11,080,764 B2
(45) Date of Patent: Aug. 3, 2021

(54) HIERARCHICAL FEATURE SELECTION AND PREDICTIVE MODELING FOR ESTIMATING PERFORMANCE METRICS

(71) Applicant: ADOBE INC., San Jose, CA (US)

(72) Inventors: Chen Dong, San Jose, CA (US);
Zhenyu Yan, Sunnyvale, CA (US);
Pinak Panigrahi, Karnataka (IN);
Xiang Wu, San Jose, CA (US);
Abhishek Pani, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 448 days.

(21) Appl. No.: 15/458,484

(22) Filed: Mar. 14, 2017

(65) Prior Publication Data
US 2018/0268444 A1 Sep. 20, 2018

(51) Int. Cl.
*G06Q 30/02* (2012.01)
*G06N 7/00* (2006.01)
(Continued)

(52) U.S. Cl.
CPC ....... *G06Q 30/0277* (2013.01); *G06F 16/245* (2019.01); *G06F 16/951* (2019.01);
(Continued)

(58) Field of Classification Search
CPC ............ G06Q 30/0242; G06Q 30/0277; G06F 16/245; G06F 16/951; G06N 5/022; G06N 7/005
(Continued)

(56) References Cited

U.S. PATENT DOCUMENTS

2008/0249832 A1* 10/2008 Richardson ........ G06Q 30/0247 705/14.46
2009/0292677 A1* 11/2009 Kim ...................... G06F 16/958
(Continued)

OTHER PUBLICATIONS

Choosing Between a Nonparametric Test and a Parametric Test, The Minitab Blog, by the Minitab Blog Editor, dated Feb. 19, 2015 and downloadd May 21, 2109 from https://blog.minitab.com/blog/adventures-in-statistics-2/choosing-between-a-nonparametric-test-and-a-parametric-test (Year: 2015).*

(Continued)

Primary Examiner — Scott D Gartland
(74) Attorney, Agent, or Firm — Shook, Hardy & Bacon L.L.P.

(57) ABSTRACT

A bid management system generates estimated performance metrics at the bid unit level to facilitate bid optimization. The bid management system includes a hierarchical feature selection and prediction approach. Feature selection is performed by aggregating historical performance metrics to a higher hierarchical level and testing features for statistical significance. Features for which a significance level satisfies a significance threshold are selected for prediction analysis. The prediction analysis uses a statistical model based on selected features to generate estimated performance metrics at the bid unit level. In some implementations, the prediction analysis uses a hierarchical Bayesian smoothing method in which estimated performance metrics are calculated at the bid unit level using a posterior probability distribution derived from a prior probability distribution determined based on aggregated performance metrics and a likelihood function that takes into account historical performance metrics from the bid unit level based on the selected features.

20 Claims, 10 Drawing Sheets

(51) Int. Cl.
  G06F 16/951    (2019.01)
  G06F 16/245    (2019.01)
  G06Q 30/08     (2012.01)
(52) U.S. Cl.
  CPC ............ *G06N 7/005* (2013.01); *G06Q 30/02* (2013.01); *G06Q 30/08* (2013.01)
(58) Field of Classification Search
  USPC ................................ 705/14.41, 14.43, 14.73
  See application file for complete search history.

(56) References Cited

U.S. PATENT DOCUMENTS

2014/0156379 A1*  6/2014  Pani ................... G06Q 30/0242
                                                   705/14.41
2018/0225711 A1*  8/2018  Murugesan ........ G06Q 30/0272

OTHER PUBLICATIONS

OLAP User's Guide, Advanced Aggregations, from Oracle, dated Dec. 4, 2015, from Archive.org the Wayback Machine, downloaded May 28, 2020 from https://docs.oracle.com/cd/E11882_01/olap.112/e17123/aggregate.htm#OLAUG900—with header (Year: 2015).*

OLAP User's Guide, Advanced Aggregations, from Oracle, dated Dec. 4, 2015, from Archive.org the Wayback Machine, downloaded May 28, 2020 from https://docs.oracle.com/cd/E11882_01/olap.112/e17123/aggregate.htm#OLAUG900—without header (Year: 2015).*

Pourabis, E., Rafanelli, M., Characterization of Hierarchies and Some Operators in OLAP Environment, downloaded Nov. 5, 2020 from http://cci.drexel.edu/faculty/song/dolap/dolap99/paper/DOLAP99_Rafa.pdf (Year: 2020).*

Agrawal et al., Modeling Multidimensional Databases, IBM Almaden Research Center, downloaded Nov. 5, 2020 from https://rakesh.agrawal-family.com/papers/icde97olap.pdf (Year: 2007).*

Agrawal as documented by Archive.org Screenshot of the WayBack Machine to be available at least by Jul. 26, 2007 (Year: 2007).*

AARKI, Using Machine Learning to Predict Campaign Performance, downloaded from https://www.aarki.com/blog/using-machine-learning-to-predict-campaign-performance on Apr. 23, 2021 (Year: 2016).*

AARKI, Using Machine Learning to Predict Campaign Performance, downloaded from Archive.org at https://web.archive.org/web/20160731172938/https://www.aarki.com/blog/using-machine-learning-to-predict-campaign-performance (Year: 2016).*

Perlich, C., et al., Machine learning for targeted display advertising: transfer learning in action, Mach Learn, 95:103-127, 2014, downloaded from https://link.springer.com/content/pdf/10.1007/s10994-013-5375-2.pdf on Apr. 23, 2021 (Year: 2014).*

* cited by examiner

FIG. 5.

BID UNIT PERFORMANCE METRICS (502)

| Keyword | Campaign | DOW | Week | Clicks | Revenue | RPC |
|---|---|---|---|---|---|---|
| 1 | 1 | Weekday | 1 | 30 | 300 | 10 |
| 1 | 1 | Weekends | 1 | 10 | 0 | 0 |
| 1 | 1 | Weekday | 2 | 100 | 200 | 2 |
| 1 | 1 | Weekends | 2 | 2 | 10 | 5 |
| 1 | 1 | Weekday | 3 | 50 | 500 | 10 |
| 1 | 1 | Weekends | 3 | 20 | 10 | 0.5 |
| 1 | 1 | Weekday | 4 | 100 | 200 | 2 |
| 1 | 1 | Weekends | 4 | 2 | 0 | 0 |
| 2 | 1 | Weekday | 1 | 70 | 200 | 2.85714286 |
| 2 | 1 | Weekends | 1 | 10 | 0 | 0 |
| 2 | 1 | Weekday | 2 | 400 | 800 | 2 |
| 2 | 1 | Weekends | 2 | 8 | 0 | 0 |
| 2 | 1 | Weekday | 3 | 150 | 100 | 0.66666667 |
| 2 | 1 | Weekends | 3 | 30 | 0 | 0 |
| 2 | 1 | Weekday | 4 | 200 | 100 | 0.5 |
| 2 | 1 | Weekends | 4 | 3 | 0 | 0 |
| 3 | 2 | Weekday | 1 | 500 | 1500 | 3 |
| 3 | 2 | Weekends | 1 | 90 | 50 | 0.55555556 |
| 3 | 2 | Weekday | 2 | 1000 | 1200 | 1.2 |
| 3 | 2 | Weekends | 2 | 50 | 0 | 0 |
| 3 | 2 | Weekday | 3 | 1000 | 1000 | 1 |
| 3 | 2 | Weekends | 3 | 2 | 0 | 0 |
| 3 | 2 | Weekday | 4 | 3800 | 600 | 0.15789474 |
| 3 | 2 | Weekends | 4 | 100 | 10 | 0.1 |
| 4 | 2 | Weekday | 1 | 500 | 500 | 1 |
| 4 | 2 | Weekends | 1 | 10 | 0 | 0 |
| 4 | 2 | Weekday | 2 | 2000 | 1800 | 0.9 |
| 4 | 2 | Weekends | 2 | 150 | 10 | 0.06666667 |
| 4 | 2 | Weekday | 3 | 1000 | 1000 | 1 |
| 4 | 2 | Weekends | 3 | 8 | 0 | 0 |
| 4 | 2 | Weekday | 4 | 1200 | 400 | 0.33333333 |
| 4 | 2 | Weekends | 4 | 200 | 5 | 0.025 |

AGGREGATED AT CAMPAIGN LEVEL (504)

| Campaign | DOW | Week | Clicks | Revenue | RPC |
|---|---|---|---|---|---|
| 1 | Weekday | 1 | 100 | 500 | 5 |
| 1 | Weekends | 1 | 20 | 0 | 0 |
| 1 | Weekday | 2 | 500 | 1000 | 2 |
| 1 | Weekends | 2 | 10 | 10 | 1 |
| 1 | Weekday | 3 | 200 | 600 | 3 |
| 1 | Weekends | 3 | 50 | 10 | 0.2 |
| 1 | Weekday | 4 | 300 | 300 | 1 |
| 1 | Weekends | 4 | 5 | 0 | 0 |
| 2 | Weekday | 1 | 1000 | 2000 | 2 |
| 2 | Weekends | 1 | 100 | 50 | 0.5 |
| 2 | Weekday | 2 | 3000 | 3000 | 1 |
| 2 | Weekends | 2 | 200 | 10 | 0.05 |
| 2 | Weekday | 3 | 2000 | 2000 | 1 |
| 2 | Weekends | 3 | 10 | 0 | 0 |
| 2 | Weekday | 4 | 5000 | 1000 | 0.2 |
| 2 | Weekends | 4 | 300 | 15 | 0.05 |

AGGREGATED AT PORTFOLIO LEVEL (506)

| DOW | Week | Clicks | Revenue | RPC |
|---|---|---|---|---|
| Weekday | 1 | 1100 | 2500 | 2.27272727 |
| Weekends | 1 | 120 | 50 | 0.41666667 |
| Weekday | 2 | 3500 | 4000 | 1.14285714 |
| Weekends | 2 | 210 | 20 | 0.0952381 |
| Weekday | 3 | 2200 | 2600 | 1.18181818 |
| Weekends | 3 | 60 | 10 | 0.16666667 |
| Weekday | 4 | 5300 | 1300 | 0.24528302 |
| Weekends | 4 | 305 | 15 | 0.04918033 |

| | Week 1 | Week 2 | Week 3 | Week 4 | Mean | Variance |
|---|---|---|---|---|---|---|
| Weekday RPC | 2.27272727 | 1.14285714 | 1.18181818 | 0.24528302 | 1.2106714 | 0.68845623 |
| Weekends RPC | 0.41666667 | 0.0952381 | 0.16666667 | 0.04918033 | 0.18193794 | 0.02682408 |

EDIT PORTFOLIO

NAME
☐T NAME

SPEND MANAGEMENT

OBJECTIVE

| PORTFOLIO NAME | STATUS |
|---|---|
| PORTFOLIO 1 | OPTIMIZED ▼  ☑ BILLABLE |

MODELING - LEARNING

MODELING - RECENCY

△ RPC PREDICTION

CAMPAIGNS

LIMITS

ADJUSTMENT METHOD

GEOGRAPHIC LOCATIONS ▼

☑ USE GEO REVENUE MODEL

| LOCATIONS | BEFORE ADJ. | ADJ. FACTOR | AFTER ADJ. |
|---|---|---|---|
| UNITED STATES - COUNTRY | 2650 | 2.838 | 7520.7 |
| CANADA - COUNTRY | 2650 | 0.339 | 898.35 |
| CHINA - COUNTRY | 2650 | 0.659 | 1746.65 |
| INDIA - COUNTRY | 2650 | 0.163 | 431.95 |

☑ AUTO ADJUST CAMPAIGN BUDGET LIMITS

MULTIPLE     MINIMUM BUDGET LIMIT SET FOR EACH CAMPAIGN 2.00     $ 5.00

☑ AUTO ADJUST BIDS

[ DELETE ]

[ SAVE ]

[ CANCEL ]

*FIG. 8B.*

HIERARCHICAL FEATURE SELECTION AND PREDICTIVE MODELING FOR ESTIMATING PERFORMANCE METRICS

BACKGROUND

Search engine marketing (SEM) involves the placement of marketing messages on search engine result pages. In particular, when users submit search queries to a search engine, the search engine returns search engine results pages that include marketing messages in conjunction with the search results for the users' search queries. The marketing messages are typically selected through an auction process. As part of the auction process, marketers bid certain amounts for particular keywords, which can be single words or multi-word phrases. The bids are often made on a cost-per-impression or cost-per-click basis. In other words, each bid represents an amount a marketer is willing to pay each time its marketing message is displayed on a search engine results page or is selected by a user. When a search query is received, keywords from the search query are identified and used to select marketing messages based, at least in part, on marketers' bids on the identified keywords.

Bid management systems are currently available that are able to control various aspects of marketers' search engine marketing in order to optimize marketing spend. For instance, bid management systems can set bid amounts for different keywords, days of the week, geolocations of users submitting the search queries, and types of devices submitting the search queries. Some existing bid management systems process historical performance data to build models that intelligently optimize bid amounts. The historical performance data can include performance metrics, such as number of clicks, costs, conversions, and revenue for various bid units. The bid management systems incorporate features associated with bid units into a model with predictions generated at the bit unit level. As used herein, a "bid unit" refers to bids associated with one or more features, such as time of day, days of week, geolocation of users, types of devices, ad groups (groups of similar marketing messages and keywords), and campaigns (groups of ad groups). For example, a bid unit could include a marketer's bids for a given keyword, on Fridays, for mobile devices. However, the performance of models built using existing bid management systems is typically unstable because the historical performance data of each bid unit is sparse, especially when there are a few categorical features included. For example, for a bid unit corresponding to Fridays, there may have only been one bid that resulted in a conversion over a given period (e.g., the past month).

SUMMARY

Embodiments of the present invention relate to, among other things, a bid management system that utilizes historical performance data to estimate performance metrics at the bid unit level to facilitate bid optimization. The bid management system includes a hierarchical feature selection framework and prediction framework. The feature selection framework of the bid management system performs feature selection by testing features of bid units at higher hierarchical levels to select statistically significant features. In particular, the feature selection framework aggregates historical performance metrics from the bid unit level to a higher hierarchical level within the hierarchy of the marketer's SEM portfolio and tests the aggregated performance metrics for statistical significance. Features for which a significance level satisfies a significance threshold are selected for prediction analysis using the prediction framework of the bid management system. The prediction framework uses a statistical model based on selected features to generate estimated performance metrics at the bid unit level. In some implementations, the prediction framework uses a hierarchical Bayesian smoothing method in which a prior probability distribution is determined using historical performance metrics aggregated at a higher hierarchical level. The prediction framework then derives a posterior probability distribution from the prior probability distribution and a likelihood function that takes into account historical performance metrics from the bid unit level based on the selected features. The prediction framework calculates estimated performance metrics at the bid unit level using the posterior probability function.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 5 includes tables illustrating examples of aggregation of performance metrics in accordance with some implementations of the present disclosure;

FIGS. 8A and 8B are screenshots showing an exemplary user interfaces for managing a marketer's search engine marketing portfolio in accordance with some implementations of the present disclosure.

DETAILED DESCRIPTION

Figure 1:
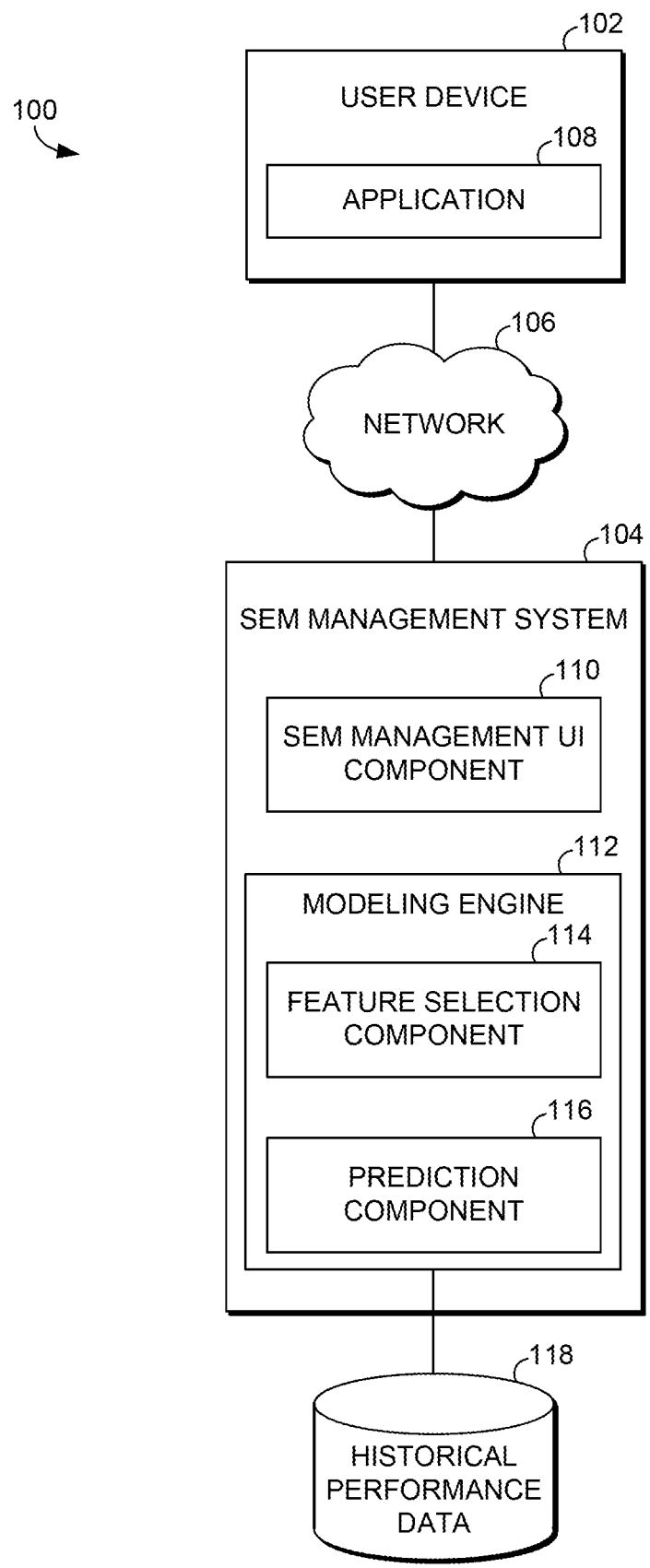
FIG. 1 is a block diagram illustrating an exemplary system in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Existing bid management systems have used a number of previous approaches to estimate performance metrics for bid optimization. However, these approaches have been unsatisfactory. For instance, one commonly used method relies on historical performance data at the bid unit level, which is the most granular level to evaluate a marketer's search engine marketing. However, this approach usually leads to a very simple model, which may lead to high bias predictions.

A second commonly used method utilizes all available information associated with the bid unit. This additional information could include, for instance, marketing portfolio structures, time of day, days of week, geolocation of users, and types of devices. Because all available information is used, this method usually leads to a complicated model, which generates low bias predictions but high variance.

A third method applies adjustment factors calculated at higher levels above the bid unit level, such as ad groups and campaigns. In particular, search engines allow marketers to organize their search engine marketing portfolio through a hierarchical approach. At the lowest level are bids on keywords, which can be viewed as the bid unit level. Similar marketing messages and keywords can be grouped together in ad groups. Ad groups can, in turn, be grouped together in campaigns, and a marketer may have multiple campaigns within their search engine marketing portfolio. For instance, marketers can organize campaigns around their categories of products or services. Marketers can adjust different settings, such as bid price, budget, and targeting information (e.g., location, day, time), at the various hierarchical levels. In this third approach, adjustment factors are calculated at higher levels in the hierarchy, and the adjustment factors are applied to underlying bid units. While this approach is expandable and flexible, bid units in the same hierarchical category are adjusted using the same factor, neglecting differences in those bid units.

Embodiments of the present invention address the technical challenge of modeling to estimate performance metrics at the bid unit level by introducing a bid management system that uses a modeling technique to perform feature selection and prediction at various hierarchical levels within the hierarchy of a marketer's SEM portfolio. The bid management system described herein performs feature selection by testing features at higher hierarchical levels to select the most statistically significant features for prediction analysis. Using only the most statistically significant features in the prediction analysis avoids overfitting and thereby improves the prediction accuracy. The feature selection process of the bid management system includes aggregating historical performance metrics from the bid unit level at a higher hierarchical level within a marketer's SEM portfolio. For instance, performance metrics can be aggregated at the ad group, campaign, or portfolio level within the marketer's SEM portfolio. The bid management system then uses a testing function to determine the statistical significance of a feature based on the aggregated performance data. The testing function provides a significance level for the feature, which is compared against a significance threshold. If the significance level satisfies the significance threshold, the feature is included in the prediction analysis. Otherwise, if the significance level does not satisfy the significance threshold, the feature is not included in the prediction analysis.

The bid management system performs the prediction analysis by employing a statistical model using selected features to generate estimated performance metrics at the bid unit level to address sparseness in historical performance metrics. In accordance with some implementations, the prediction analysis of the bid management system uses a hierarchical Bayesian smoothing method that provides stable predictions based on the features selected. As is known in Bayesian probability, a posterior probability distribution (a "posterior") can be derived based on a prior probability distribution (a "prior") and a likelihood function. The prior probability distribution is a probability distribution for a metric before relevant evidence or observations are taken into account. The likelihood function provides a function of the metric based on relevant evidence or observations. The posterior probability distribution is a probability distribution for the metric given the relevant evidence or observations. In accordance with some implementations, the hierarchical Bayesian smoothing method determines a prior probability distribution using historical performance metrics aggregated at a higher hierarchical level. A posterior probability distribution is then derived from the prior probability distribution and a likelihood function that takes into account historical performance metrics from the bid unit level based on the selected features. Estimated performance metrics are calculated at the bid unit level using the posterior probability function.

With reference now to the drawings, FIG. 1 is a block diagram illustrating an exemplary system 100 for managing a marketer's search engine marketing portfolio in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 interacting with a search engine marketing (SEM) management system 104 to manage a marketer's SEM portfolio. Each of the user device 102 and SEM management system 104 shown in FIG. 1 can be provided on one or more computer devices, such as the computing device 900 of FIG. 9, discussed below. As shown in FIG. 1, the user device 102 and the SEM management system 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and SEM management systems may be employed within the system 100 within the scope of the present invention. Each may comprise a single device or multiple devices cooperating in a distributed environment. For instance, the SEM management system 104 could be provided by multiple server devices collectively providing the functionality of the SEM management system 104 as described herein. Additionally, other components not shown may also be included within the network environment.

A marketer employs the user device 102 to interact with the SEM management system 104 to actively manage the marketer's SEM portfolio. This could include organizing the SEM portfolio (e.g., creating and adjusting campaigns, ad groups, keywords, etc.) and setting budget, including the bids associated with keywords in the SEM portfolio. The user device 102 can be any type of computing device such as, for instance, a personal computer (PC), tablet computer, desktop computer, mobile device, or any other suitable device having one or more processors 102. The user device 102 includes an application 108 for interacting with the SEM management system 104. The application 108 can be, for instance, a web browser that allows the user device 102 to access the SEM management system 104 or a dedicated application for managing the SEM portfolio.

As noted above, the SEM marketing system 104 allows a marketer to manage the marketer's SEM portfolio. The SEM marketing system 104 can be implemented using one or more server devices, one or more platforms with corresponding application programming interfaces, cloud infrastructure, and the like. While the SEM marketing system 104 is shown separate from the user device 102 in the configuration of FIG. 1, it should be understood that in further configurations, the SEM marketing system 104 can be provided as an application on the user device 102.

The SEM management system includes a SEM management user interface (UI) component 110. The SEM management UI component 110 provides various UIs to the user device 102 that allow the marketer to interact with the SEM management system 104. Among other things, the UIs can allow the marketer to organize the structure of the SEM portfolio, provide analytics regarding performance of the SEM portfolio, and allow the marketer to manage budgetary aspects, including setting bids for keywords.

As shown in FIG. 1, the SEM management system 104 also includes a modeling engine 112, which performs modeling using historical performance data to predict estimated performance metrics at the bid unit level within the marketer's SEM portfolio. The modeling engine 112 includes a feature selection component 114 and a prediction component 116.

The feature selection component 114 automatically selects features of bid units for use in generating a model. The features could include, for instance, time of day, day of week, geolocation of user submitting a search query, type of device used to submit a search query, adgroup to which a keyword belongs, and campaign to which a keyword belongs. Generally, the feature selection component 114 tests the features at various hierarchical levels such that the resulting model is built using the most statistically important or significant features. This avoids overfitting, and thus improves the prediction accuracy of the resulting model.

To select features, the feature selection component 114 takes performance metrics, at the bid unit level, from historical performance data, and aggregates the performance metrics at a higher hierarchical level in the hierarchy of the marketer's SEM portfolio to generate aggregated performance data. Generally, the historical performance data includes performance metrics collected at the individual bid unit level reflecting the actual performance of bids over a previous time interval. Any of a variety of performance metrics may be available in various configurations, such as, for instance, clicks, cost, conversions, revenue, and revenue per click. The historical performance data can be stored in a data store 118, which can be implemented, for instance, as one or more databases or one or more data servers.

As indicated above, performance metrics can be aggregated based on an existing hierarchy set forth by the structure of the marketer's SEM portfolio. For example, the performance metrics can be aggregated based on ad groups or campaigns defined by the marketer's SEM portfolio. In another example, the performance metrics can be aggregated across the marketer's entire SEM portfolio. As a specific example to illustrate, suppose that performance metrics for revenue per click (RPC) are to be aggregated to assess a "Day of Week" (DOW) feature that reflects the significance of days of the week to RPC. The bid unit level would comprise RPC data for each day of the week for each keyword in the marketer's SEM portfolio. For instance, one bid unit could include all bids for a particular keyword on Mondays. The RPC data for that bid unit would be based on the revenue generated per click resulting from bids for that particular keyword on Mondays. To aggregate performance data at the ad group level, keywords belonging to each ad group are identified from the hierarchical structure of the marketer's SEM portfolio, and the RPC data from keywords belonging to each ad group are aggregated to provide aggregated RPC data for each ad group for each day of the week. To aggregate performance data at the campaign level, ad groups belonging to each campaign are identified from the hierarchical structure of the marketer's SEM portfolio, and the RPC data for ad groups belonging to each campaign are further aggregated to provide aggregated RPC data for each campaign for each day of the week.

The feature selection component employs a testing function to process the aggregated performance data to determine whether each feature is significant. The testing function can be any parametric or nonparametric statistical test that determines a significance level for a feature. For example, the testing function could be "analysis of variance" (ANOVA) or "analysis of similarities." A threshold is set on significance, and a feature is selected if the significance level determined for the feature satisfies the significance threshold. As such, the output from the testing function is a decision of whether to use each feature in building the resulting model. In some configurations, the feature selection component 114 performs feature selection using the method 300 described below with reference to FIG. 3

The prediction component 116 operates to build a model based on the features selected by the feature selection component 114 and historical performance data. The prediction component 116 uses a prediction function to generate predictions of performance metrics for each bid unit. The prediction function can be, for instance, any parametric statistical test. Generally, the prediction function employs aggregated performance data and performance data at the bid unit level in order to generate predicted performance metrics at the bid unit level. In some configurations, a hierarchical Bayesian smoothing method is used to generate stable predictions. For instance, in some configurations, the prediction component 116 uses the method 600 of FIG. 6 to perform predictions.

Figure 2:
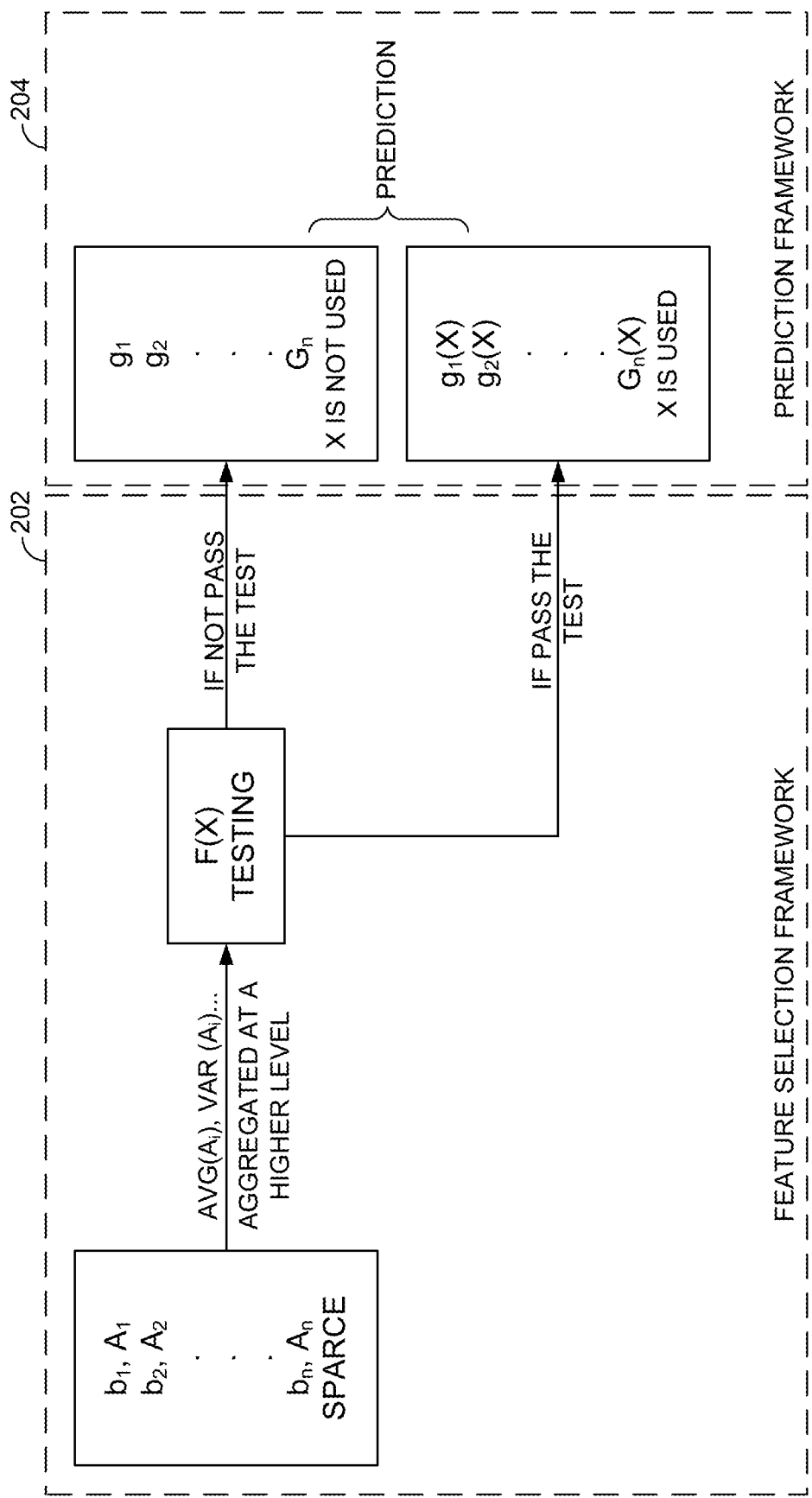
FIG. 2 is a block diagram illustrating a feature selection framework and prediction framework in accordance with some implementations of the present disclosure.

FIG. 2 provides a block diagram illustrating a feature selection framework 202 and a prediction framework 202 of the feature selection component 114 and the prediction component 116, respectively. Assuming there are n bid units included in a higher hierarchical level (e.g., an ad group, ad campaign, portfolio, etc.), $A_i$ (i=1, . . . , n) denotes the performance metric corresponding to each bid $b_i$ for bid unit i from historical performance data. Within the feature selection framework 202, the performance metrics from the historical performance data are aggregated at a higher hierarchical level, which could include determining the average and variance of $A_i$. A testing function, f, is used to determine if each feature X is important or significant when tested at the higher hierarchical level. If a feature X passes the significance test (e.g., the significance level for feature X exceeds a significance threshold), the feature X is included in the prediction framework 204. Alternatively, if a feature X does not pass the significance test (e.g., the significance level for feature X does not exceed the significance threshold), the feature X is not included in the prediction framework 204. By way of example to illustrate, suppose the feature "Day of Week" (DOW) is tested under the feature selection framework, where $X_j$ (j=1, ..., 7) is a categorical variable corresponding to each day of the week. If the variable $X_j$ shows significance based on aggregated performance data, the DOW feature is included in the input for the prediction framework 204.

In the prediction framework 204, g denotes a prediction function that generates predictions of performance metrics for each bid unit i at the bottom hierarchical level (bit unit level) instead of the higher hierarchical level. Here, the feature X is available both at the higher hierarchical level and the bottom hierarchical level. Note that, when g is not identical to f, g should be able to capture the effects of the feature X tested by f.

In some configurations, for the sake of model simplicity, the same framework can be used for both feature selection and prediction. In such implementations, the feature selection and predication are conducted at the same time by using the same statistical model for the feature selection and prediction functions.

Figure 3:
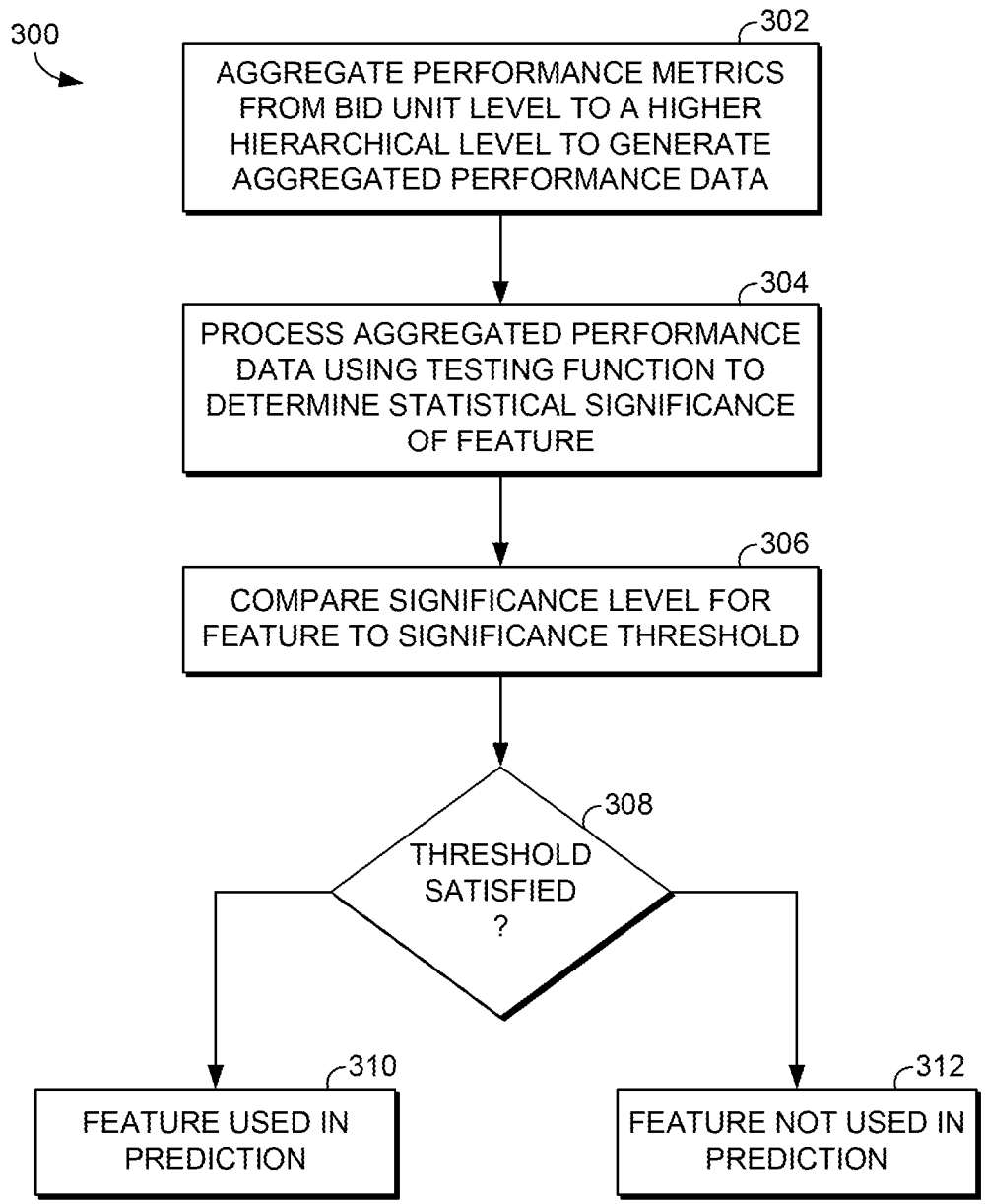
FIG. 3 is a flow diagram showing a method for performing feature selection in accordance with some implementations of the present disclosure.

With reference now to FIG. 3, a flow diagram is provided that illustrates a method 300 for performing feature selection. The method 300 may be performed, for instance, by the feature selection component 114 of FIG. 1. Each block of the method 300 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 302, performance metrics at the bid unit level from historical performance data are aggregated at a higher hierarchical level to generate aggregated performance data. As indicated previously, the higher hierarchical level can be from an existing hierarchy established by the marketer's SEM portfolio, such as an ad group, campaign, or the overall SEM portfolio. For example, suppose performance metrics from the bid unit level are being aggregated at the ad group level. For each ad group, the bid units belonging to the ad group would be identified and the performance metrics of those bid units aggregated.

As shown at block 304, the aggregated performance data is processed using a testing function to determine the statistical significance for a feature. As noted above, the testing function can be any parametric or nonparametric statistical test that provides a significance level for a feature, such as analysis of variance (ANOVA) or analysis of similarities.

The significance level for the feature is compared to a significance threshold, as shown at block 306. If it is determined at block 308 that the significance level for the feature satisfies the significance threshold, the feature is used in prediction, as shown at block 310. Alternatively, if it is determined at block 308 that the significance level for the feature does not satisfy the significance threshold, the feature is not used in prediction, as shown at block 312. The method 300 could be performed for any number of features in order to select one or more statistically significant features for the prediction analysis.

Figure 4:
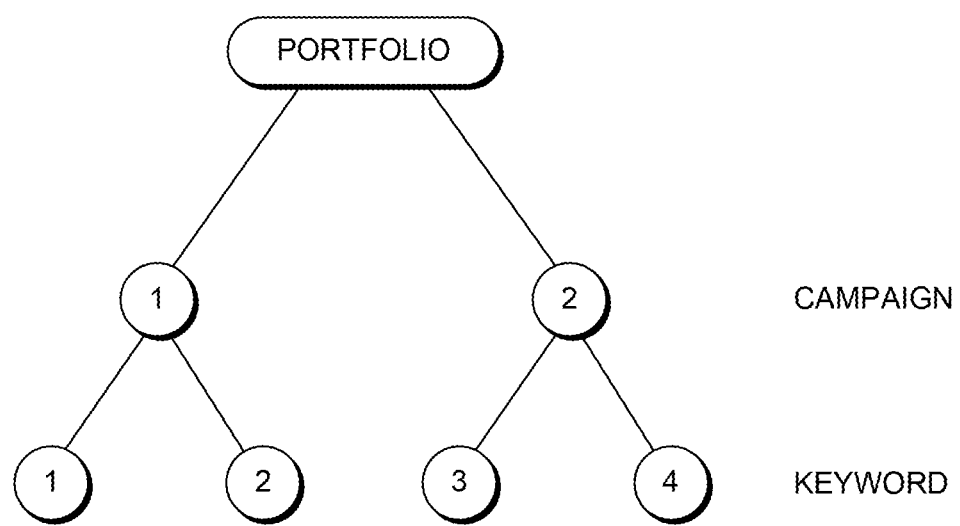
FIG. 4 is a diagram providing an example of a search engine marketing hierarchy used in accordance with some implementations of the present disclosure.

By way of example to illustrate, suppose that a feature corresponding to weekdays versus weekends is being tested to determine if a weekdays/weekends feature should be used to estimate the revenue per click (RPC) for each keyword in a marketer's portfolio. Analysis of the feature looks at whether there is significant difference between weekday RPCs and weekend RPCs. As shown in FIG. 4, in the present example, the marketer's portfolio includes two campaigns. Campaign 1 includes keyword 1 and keyword 2. Campaign 2 includes keyword 3 and keyword 4.

As shown in Table 502 of FIG. 5, four weeks of historical performance data is available for each keyword that reflects the actual number of clicks and actual revenue received for each keyword on weekdays and weekends for each of the four weeks. The performance metrics from Table 502 are aggregated at the campaign level, as shown in Table 504. Those performance metrics are then again aggregated at the portfolio level, as shown in Table 506. Based on these samples, a simple linear regression with a weekdays/weekends indicator can then be used to determine the significance of the feature directed to weekdays/weekends. As another example, a two sample t test based on the mean and variance could be used to test the significance. In the present example, it is determined that the weekday RPCs and weekend RPCs are statistically different. As such, the weekdays/weekends feature would be used when performing the prediction analysis.

Figure 6:
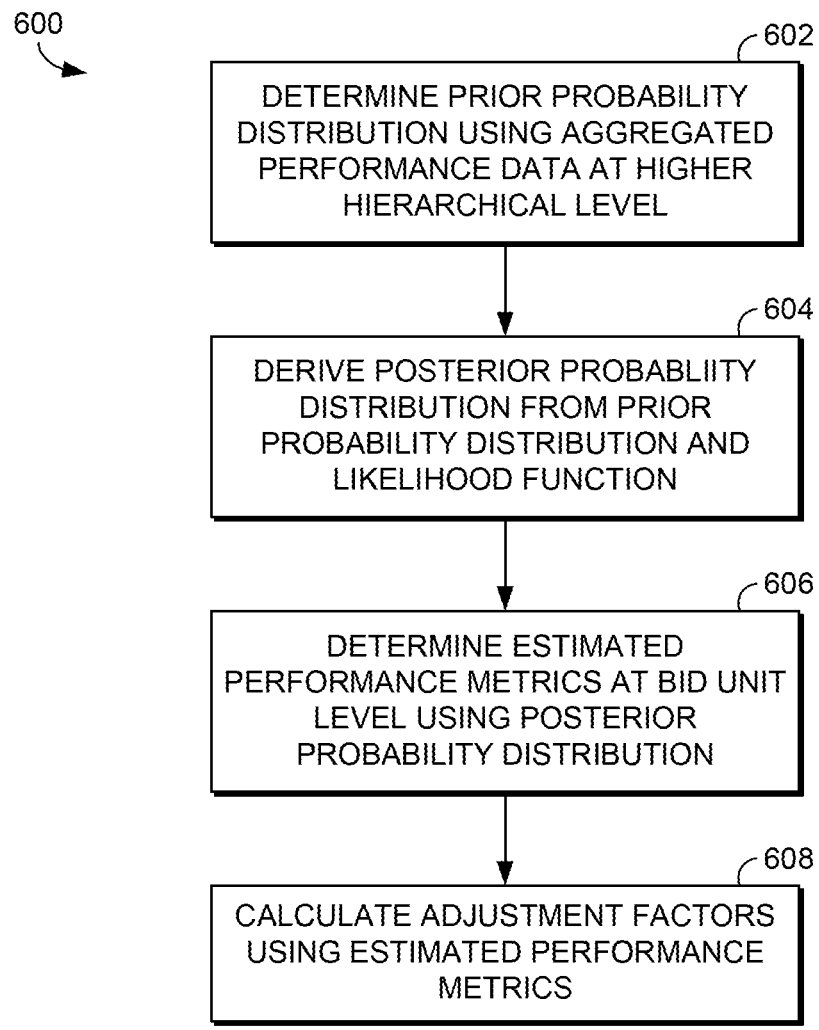
FIG. 6 is a flow diagram showing a method for using a hierarchical Bayesian smoothing approach to provide prediction in accordance with some implementations of the present disclosure.

Once the hierarchy is determined and features selected, many kinds of machine learning methods could be used to predict estimated performance metrics. But often, the available historical performance metrics are very sparse which leads to unsatisfactory results. Accordingly, in some implementations, a Bayesian smoothing method is used to incorporate prior beliefs to overcome the sparsity issue. In the hierarchy, performance metrics of the children of a parent node (e.g. RPCs of bid units in an ad group) are assumed to follow a specific distribution of which the parameter has a prior distribution inherited from the parent. Turning next to FIG. 6, a flow diagram is provided showing a method 600 for using a hierarchical Bayesian smoothing approach to provide prediction. The method 600 may be performed, for instance, by the prediction component 116 of FIG. 1.

Figure 7:
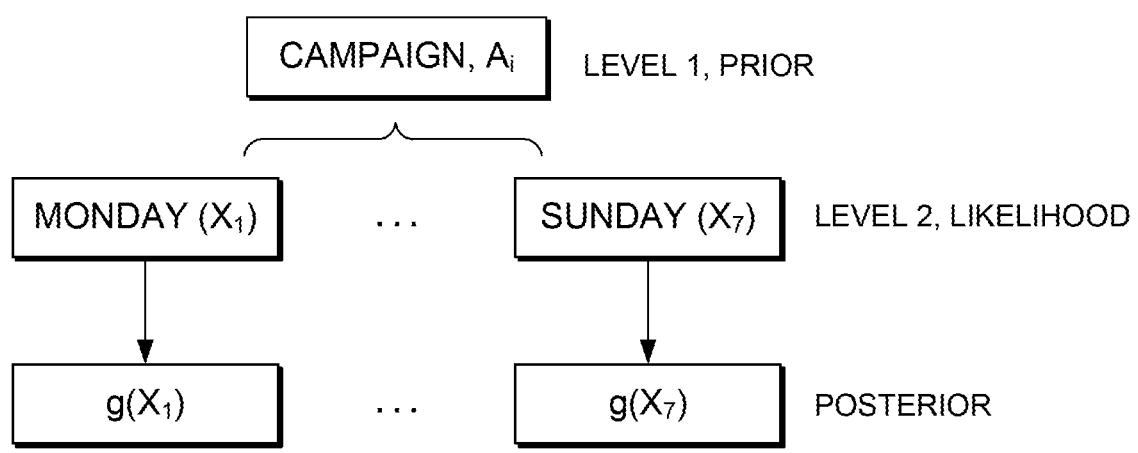
FIG. 7 is a diagram showing a simple two level hierarchy used in performing prediction in accordance with some implementations of the present disclosure.

As shown at block 602, a prior probability distribution (i.e., a "prior") is determined using aggregated performance data at a higher hierarchical level. For instance, the prior probability distribution can be defined as follows:

Prior: $\lambda_j \sim G(\alpha, \beta, \ldots)$ where $\lambda_j$, ... are parameters of interest which follow a prior distribution denoted by G with hyperparameters $\alpha, \beta, \ldots$. In the case of empirical Bayes method, $\alpha, \beta, \ldots$ can be estimated from the historical performance metrics. By way of a simple example to illustrate, FIG. 7 shows a simple two level hierarchy to determine if the "Day of Week" (DOW) feature is statistically significant. In FIG. 7, $A_i$ (i=1, ..., n) denotes the historical performance metric for each bid unit at campaign level and $X_j$ (j=1, ..., 7) is a categorical variable corresponding to each day of the week. Information contained at the campaign level (i.e., 'parent' or level 1) can be considered as a prior to predict performance metrics for each day of week (i.e., 'sibling' level 2).

A posterior probability distribution (i.e., a "posterior") is derived from the prior probability distribution and a likelihood function, as shown at block 604. This in effect combines the information of the higher hierarchical level (e.g., the 'parent' or level 1 of FIG. 7) and the information provided at the bid unit level. The likelihood function and posterior probability distribution can be defined as follows:

Likelihood: $\lambda_{ij} \sim p(\lambda_{ij}, \ldots)$

Posterior: $\lambda_j | A_{ij}, \alpha, \beta \sim G(A_{ij}, \alpha, \beta)$ where $A_{ij}$ denotes the $i^{th}$ observation in $j^{th}$ category of a feature, which follows a distribution labeled by p that may be Normal, Poisson, or otherwise depending on the assumption used. Note that a conjugate prior (G) can be chosen in order to simplify the prediction formula.

The posterior probability distribution is used for prediction to derive performance metrics at the bid unit level. Accordingly, as shown at block 606, estimated performance metrics for a bid unit are determined using the posterior probability distribution. The performance metric of bid unit i in category j can be estimated as follows:

$\hat{g}(A_{ij}) = g(A_{ij}, X_j) = \text{mean}(\Delta_j)$ where $\lambda_j$ follows the posterior probability distribution.

Adjustment factors are calculated using the estimated performance metrics from the prediction, as shown at block 608. Each adjustment factor can be used to calculate a final prediction for a performance metric, which is computed as a base prediction multiplied by the adjustment factor. The base prediction and the adjustment factors can be stored in a database and used to generate final predictions. For example, for day of week, a base prediction for a performance metric could be defined as the average of 7 days predictions for that performance metric. The final prediction for each day of week is computed as the base prediction multiplied by an adjustment factor for each day of week.

The adjustment factors can be calculated using the following:

$$adj_{ij} = \frac{\hat{g}(A_{ij})}{g(A_{ij})} = \frac{\text{mean}(\lambda_j)}{g(A_{ij})}$$

where $g(A_{ij})$ denotes the base prediction without the X feature.

The following discussion provides a specific example to illustrate the prediction process using an empirical Bayes estimate for a two-level structure. In the present example, an assumption is made that the RPCs of nodes at hierarchical level k follows a Poisson distribution as follows:

$$\text{Revenue}_i \propto f(y_i | \lambda_i, \tau_i) = \frac{\exp(-\lambda_i \tau_i)(\lambda_i \tau_i)^{y_i}}{y_i!}, \quad \text{(Equation 1)}$$

where $y_i$ denotes the revenue observed, $\tau_i$ denotes the total number of clicks and $\lambda_i$ is the parameter of interest which denotes the RPC. A Gamma prior is assumed for $\lambda_i$, $$\lambda_i \propto g(\lambda_i | \alpha, \beta) = \frac{\lambda_i^{\alpha-1} \exp(-\lambda_i / \beta)}{\Gamma(\alpha) \beta^\alpha}, \quad \text{(Equation 2)}$$

where $\alpha, \beta$ are hyperparameters.

The posterior is also a Gamma distribution, which can be verified to have the hyperparameters $$\alpha' = y_i + \alpha, \quad \beta' = \frac{1}{\tau_i + \frac{1}{\beta}},$$

the mean of which providing the estimators for the $\lambda_i$ at level k, $$E(\lambda_{ik}) = (y_{ik} + \hat{\alpha}) \bigg/ \left(\tau_{ik} + \frac{1}{\hat{\beta}}\right), \quad \text{(Equation 3)}$$

where $\hat{\alpha}, \hat{\beta}$ can be estimated by the maximum likelihood method.

To obtain estimations of the RPCs for weekdays and weekends, suppose that weekday historical Revenue (aggregated)=10400, weekend historical Revenue=95, with the number of clicks ($\tau_{weekday}$=12100, $\tau_{weekend}$=695). Since a Gamma distribution is assumed for $\lambda_i$ ($\lambda_1$=0.86, $\lambda_2$=0.13), $\hat{\alpha}, \hat{\beta}$ can be approximated based on $\lambda_i$ ($\hat{\alpha}$=0.92, $\hat{\beta}$=0.53), or estimated by the maximum likelihood method. Estimations of RPCs for weekdays and weekends are as shown below:

$$E(\lambda_{weekday}) = (10400 + 0.92) \bigg/ \left(12100 + \frac{1}{0.53}\right)$$

$$E(\lambda_{weekend}) = (95 + 0.92) \bigg/ \left(695 + \frac{1}{0.53}\right)$$

The following discussion provides an additional example based on a modified empirical Bayes estimate for a multilevel structure. Equation 3 above only borrows estimations from the current hierarchical level (i.e., siblings) but not from other parents. Thus, it might not be suitable for multi-level hierarchies. A modified version is proposed to overcome this disadvantage, $$E(\lambda_{ik}) = (y_{ik}\hat{\beta} + \lambda_{k-1})/(\tau_{ik}\hat{\beta} + 1), \quad \text{(Equation 4)}$$

where $\lambda_{k-1}$ denotes the estimation for the parent which also borrows from other parents. From equation 4 above, it can be seen that if the $\hat{\beta}$ (which indicates the variance of the current hierarchical level) is larger, the weight for the parent is smaller.

Based on the equations above, the RPC of the parent $$\lambda_{k-1} = \frac{10495}{12795} = 0.82,$$

and estimations of RPCs for weekdays and weekends are as follows:

$E(\lambda_{weekday})$=(10400*0.53+0.82)/(12100*0.53+1)

$E(\lambda_{weekend})$=(95*0.53+0.82)/(695*0.53+1)

Figure 8A:
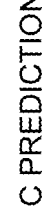

FIGS. 8A and 8B provide screenshots of user interfaces 800A and 800B used to manage a marketer's SEM portfolio. The user interface 800A shows the output provided by the modeling technique described herein to improve the RPC prediction in the SEM management system based on day of week. The user interface 800B shows the output provided by the modeling technique to improve the revenue prediction in the SEM management system based on locations. The marketer can employ the predictions to adjust their bids in order to optimize their SEM efforts.

Figure 9:
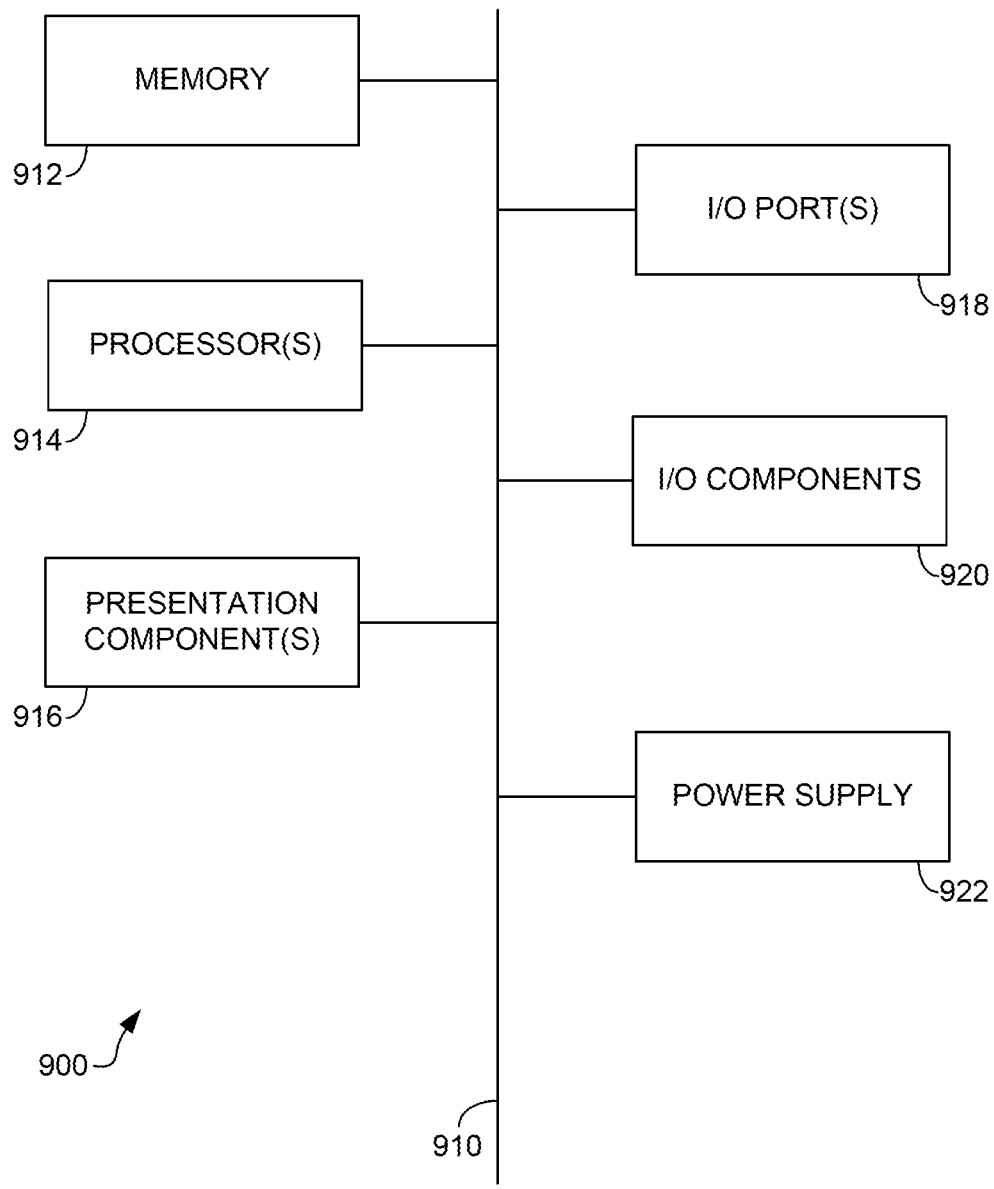
FIG. 9 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM. EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion.

As described above, implementations of the present disclosure relate to bid optimization that includes modeling to generated estimated performance metrics at the bid unit level using hierarchical feature selection and prediction frameworks. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer system comprising:
a processor; and
a computer storage medium storing computer-useable instructions that, when used by the processor, cause the processor to:
perform feature selection to generate a machine learning model, the feature selection being done by:
aggregating, by the processor executing a feature selection component, performance metrics of each feature, of a plurality of features, for a plurality of bid units from a bid unit hierarchical level to a first hierarchical level to generate aggregated performance data, the first hierarchical level comprising a hierarchical level above the bid unit hierarchical level within a hierarchical structure;
in response to the aggregating of the performance metrics, employing, by the processor executing the feature selection component, a statistical testing function to determine a significance level for each feature, of the plurality of features, at the first hierarchical level using the aggregated performance data; and
comparing, by the processor executing the feature selection component, the significance level at the first hierarchical level for each feature to a significance threshold;
based on determining that the significance level for a first feature, of the plurality of features, at the first hierarchical level satisfies the significance threshold, generating, by the processor executing the feature selection component, the machine learning model using the first feature as input;
based on determining that the significance level for a second feature, of the plurality of features, at the first hierarchical level fails to satisfy the significance threshold, excluding the second feature from being used as input into the machine learning model;
performing, by the processor executing a prediction component, a prediction analysis using the first feature and the machine learning model based at least in part on the aggregating of the performance metrics, the generating of the machine learning model, and the excluding of the second feature; and
in response to the performing of the prediction analysis, causing, by the processor executing a SEM management UI component, a user interface to be generated, the user interface indicates the feature and the prediction analysis.

2. The system of claim 1, wherein the hierarchical structure is based on a marketer's search engine marketing portfolio.

3. The system of claim 2, wherein the first hierarchical level is any of: an ad group level, a campaign level, and a portfolio level.

4. The system of claim 1, wherein the statistical testing function comprises a parametric or nonparametric statistical test.

5. The system of claim 4, wherein the statistical testing function comprises analysis of variance (ANOVA) or analysis of similarities.

6. The system of claim 1, wherein the instructions further cause the processors to calculate adjustment factors using the estimated performance metrics.

7. The system of claim 6, wherein the instructions further cause the processors to apply the adjustment factors to bid amounts to adjust the bid amounts.

8. A computer storage medium storing computer-useable instructions that, when executed by a computing device, cause the computing device to perform operations, the operations comprising:
performing feature selection to select a feature of a plurality of features for a plurality of bid units by aggregating, by the computing executing a feature selection component, performance metrics for each feature for the plurality of bid units from a bid unit hierarchical level to a first hierarchical level and, the first hierarchical level comprising a hierarchical level above the bid unit hierarchical level within a hierarchical structure;
employing, by the computing device executing the feature selection component, a statistical testing function to determine a significance level for each feature, of the plurality of features, at the first hierarchical level using the aggregated performance statistics;
based on determining that the significance level for a first feature, of the plurality of feature at the first hierarchical level exceeds a threshold and that a second feature, of the plurality of features, fails to exceed the threshold, generating, by the computing device executing the feature selection component, a model with the first feature as input, wherein the second feature is excluded from being used by the model as input;
in response to the generating of the model with the first feature as input, performing, by the computing device executing a prediction component, prediction analysis by using hierarchical Bayesian smoothing to employ the aggregated performance metrics as a prior probability distribution to generate estimated performance metrics for each bid unit.

9. The computer storage medium of claim 8, wherein the aggregated performance metrics are tested for statistical significance for the feature from the plurality of features by:
comparing the significance level for the feature to a significance threshold; and
selecting the feature for prediction analysis based on the significance level for the feature satisfying the significance threshold.

10. The computer storage medium of claim 8, wherein the hierarchical structure is based on a marketer's search engine marketing portfolio.

11. The computer storage medium of claim 10, wherein the first hierarchical level is any of: an ad group level, a campaign level, and a portfolio level.

12. The computer storage medium of claim 8, wherein the statistical testing function comprises a parametric or nonparametric statistical test.

13. The computer storage medium of claim 12, wherein the statistical testing function comprises analysis of variance (ANOVA) or analysis of similarities.

14. The computer storage medium of claim 8, wherein the hierarchical Bayesian smoothing comprises:
determining the prior probability distribution using the aggregated performance metrics;
deriving a posterior probability distribution from the prior probability distribution and a likelihood function using the selected feature and performance metrics for each bid unit; and
calculating the estimated performance metrics for each bid unit using the posterior probability distribution.

15. The computer storage medium of claim 8, wherein the operations further comprise calculating adjustment factors using the estimated performance metrics.

16. The computer storage medium of claim 15, wherein the operations further comprise applying the adjustment factors to bid amounts to adjust the bid amounts.

17. A computer system comprising:
- feature selection means for performing feature selection to select a first feature as input into a model and to exclude a second feature from the model, the selecting of the first feature and the excluding of the second feature being based on using aggregated performance data generated by aggregating performance metrics for the first feature and second feature for a plurality of bid units from a bid unit hierarchical to a first hierarchical level above the bid unit hierarchical level within a hierarchical structure; and
- prediction means for generating estimated performance metrics for each bid unit using the model generated from the performance metrics and the first feature selected by the feature selection based at least in part on the selecting of the first feature and the excluding of the second feature.

18. The computer system of claim 17, wherein the hierarchical structure is based on a marketer's search engine marketing portfolio.

19. The computer system of claim 17, wherein the first hierarchical level is any of: an ad group level, a campaign level, and a portfolio level.

20. The computer system of claim 17, wherein the prediction means also calculates adjustment factors using the estimated performance metrics to adjust bid amounts in a marketer's search engine marketing portfolio.

* * * * *